Aug. 3, 1954  G. V. BUTLER ET AL  2,685,469
ADJUSTABLE COUPLING

Filed Dec. 14, 1951  2 Sheets-Sheet 1

INVENTOR.
George V. Butler
Edward P. MacDonough
BY William R. Robertson
Agent

Aug. 3, 1954  G. V. BUTLER ET AL  2,685,469
ADJUSTABLE COUPLING
Filed Dec. 14, 1951  2 Sheets-Sheet 2

INVENTOR.
George V. Butler
Edward P. MacDonough
BY William R. Robertson
Agent

Patented Aug. 3, 1954

2,685,469

UNITED STATES PATENT OFFICE 2,685,469

ADJUSTABLE COUPLING

George V. Butler and Edward P. MacDonough, Dallas, Tex., assignors, by mesne assignments, to Chance Vought Aircraft, Incorporated, a corporation of Delaware Application December 14, 1951, Serial No. 261,712

5 Claims. (Cl. 287—129)

1

This invention relates to couplings and more particularly to stationary couplings having adjustable parts for the adjustable positioning of the members being coupled.

An object of this invention is to provide a coupling which will overcome manufacturing dimensional discrepancies in articles to be coupled.

Another object is to provide a coupling having adjustable parts by which one of the members being coupled may be accurately positioned with relation to the other.

A further object is to provide a coupling which permits accurate positioning of parts.

A still further object is the provision of a coupling by which manufacturing costs of assemblies are reduced.

Yet another object is to provide a coupling for joining two elements which will accurately position one of the elements relative to the other and which will prevent displacement of the positioned elements.

An additional object is to provide a coupling for adjustably positioning two elements and hold them against displacement and which will carry shear loads.

It will be readily understood in the manufacture of airplanes and other assemblies, that certain points such as the axis of pivotation of the control surfaces of airplanes must be accurately positioned in relation to the whole assembly to maintain the trim and stability of the craft. It often happens that such points can be precisely located only with considerable difficulty and rework because the mounting arrangements for them are slightly off position dimensionally due to manufacturing discrepancies. The present invention overcomes that difficulty by providing an adjustable coupling which allows, through adjustment of its parts, to position accurately the members being coupled within calculated tolerances.

The coupling of this invention consists of two mating plate members, one of which remains in a fixed position, and the other of which carries the part to be precisely located and is adjustable in its relation to the first plate. Each plate has mating serrated portions on its facing surface. The plates are so constructed that, if the structure is dimensionally accurate, the plates will fit together so that the serrations will mate with each other and the desired point to be precisely located will be in the exact center of both the fixed plate and the adjustable plate members. If, however, there are slight inaccuracies in the structure, the fixed plate member can be mounted on

2 the structure on mounting bolts, and the adjustable plate member can be moved from side to side, or diagonally, with relation to the fixed plate, in which case only some of the serrations will mate, but the point to be located will then be accurately positioned.

For a more complete understanding of the invention reference may be had to the following description taken in connection with the accompanying drawings and its scope will be pointed out in the appended claims.

Figures 1, 2, 3:
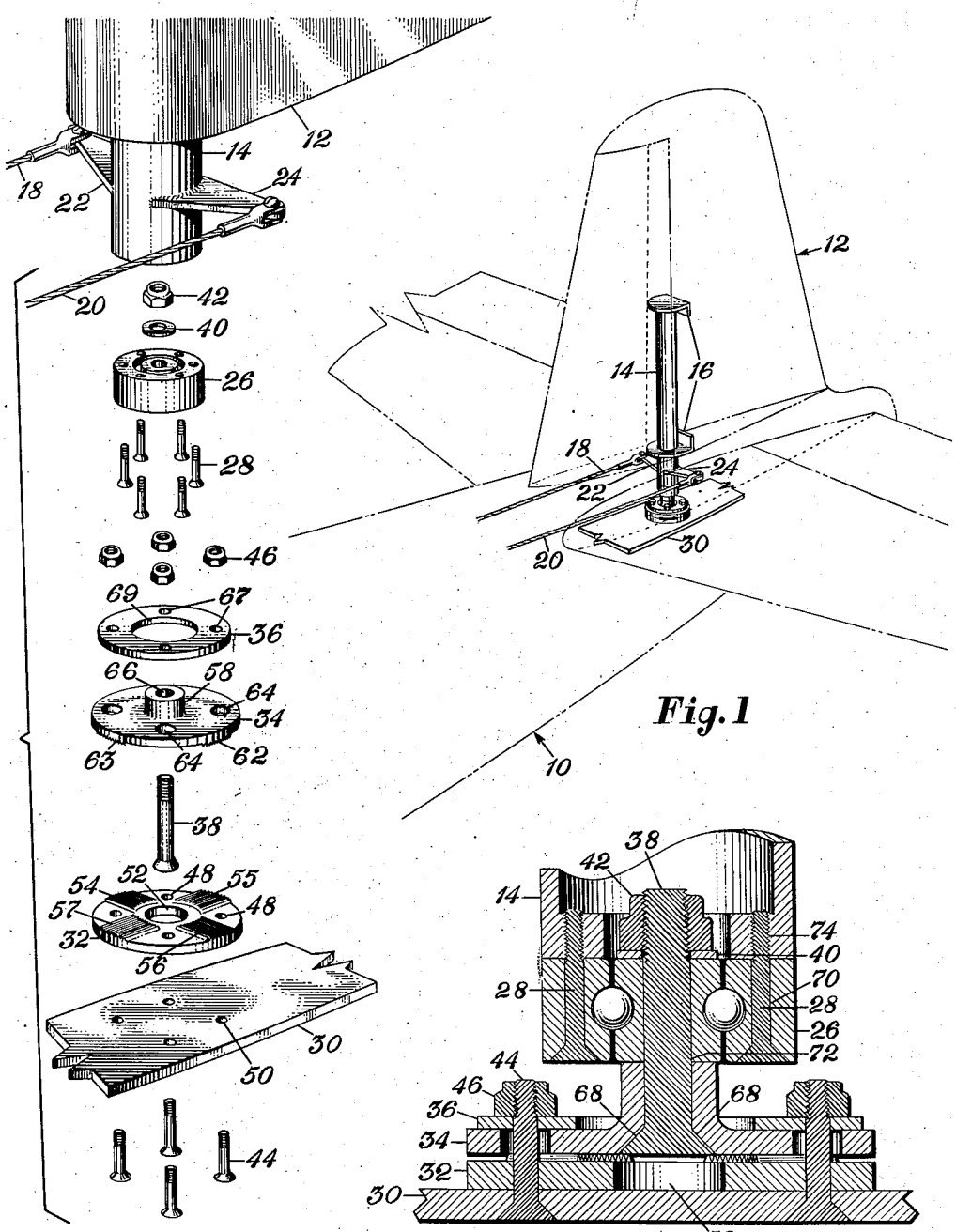
Fig. 1 is an illustration showing a rudder hinge and hinge plate of an airplane with the tail portion of the airplane being shown in phantom.
Fig. 2 is an exploded view showing the parts of the rudder hinge and hinge plate including the serrated adjustable coupling plate members.
Fig. 3 is a sectional view of the adjustable coupling with attaching parts.

Fig. 1 shows the aft portion and empennage of an airplane 10 including a rudder 12 attached to a torque tube 14 through flanges 16 and adapted to be pivoted about the axis of torque tube 14 when cables 18 or 20 attached to arms 22 and 24 respectively, which arms extend from and are secured to torque tube 14, are pulled by the pilot.

A bearing 26 is secured to the base of torque tube 14 by screws 28 to reduce friction loads.

It will be understood that, to maintain proper trim and balance of the airplane, the point of pivotation of the rudder must be held to a precise position with relation to the rest of the airplane structure within close tolerances. The present invention serves to maintain the close positioning of the rudder pivot point regardless of manufacturing discrepancies in the fabrication or assembly of the parts making up the airplane. To that end the coupling of the present invention mounts the bearing 26 on a structural frame element 30 of the airplane providing a solid support for the rudder.

A preferred embodiment of our novel coupling comprises a lower fixed plate member 32, an upper adjustable plate member 34, a washer ring 36, a bearing mounting bolt 38 with its locking washer 40 and nut 42 and coupling mounting bolts 44 with their lock nuts 46.

Lower fixed plate member 32 is provided with mounting holes 48 corresponding to mounting holes 50 in frame element 30. If desired, as in airplane use, the plate 32 may be provided with a central lightening hole 52. One face of plate member 32 is provided with four raised serrated pads, 54, 55, 56 and 57, arranged on the rectangular coordinate axes of the plate surface and between the mounting holes 48. The individual serrations in each pad are parallel to each other and parallel to the individual serrations of the diametrically opposed pad, the serrations of each pad, or group, being at right angles to the serrations of the contiguous pads. The pads 54, 55, 56 and 57 begin at the outer periphery of plate member 32 and continue inwardly parallel to a radius but for a distance less than the radius of member 32 so that the serrations of one group do not contact the serrations of any other group. The mounting holes 50 in frame element 30 and the mounting holes 48 in plate member 32 are of such diameter as to snugly accommodate the shanks of mounting bolts 44.

Figure 4:
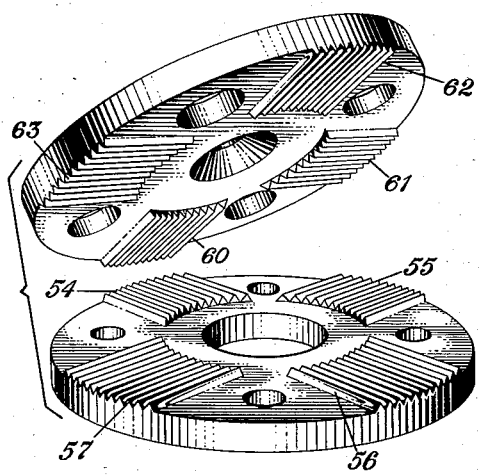
Fig. 4 is a view of the serrated fixed plate member and the serrated adjustable plate member of the coupling showing the mating serrated pads of each.
Figure 6:
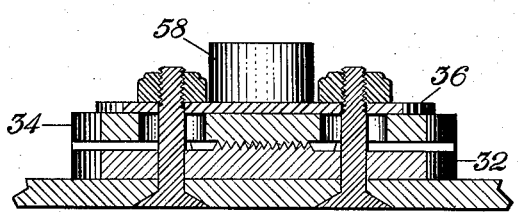
Fig. 6 is a sectional view taken along lines 6—6 of Fig. 5 with bolts and structural frame member added.
Figure 5:
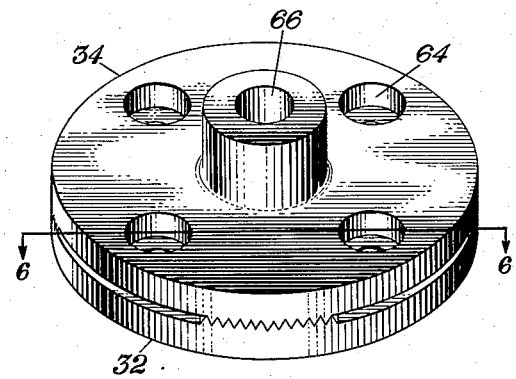
Fig. 5 is a perspective view of the fixed plate member and adjustable plate member in centered relationship.

The adjustable plate member 34 is provided in this illustration with an upstanding boss 58 in the central portion of the plate. The face of the plate member 34 on the surface opposite the surface supporting boss 58, as shown best in Fig. 4, is provided with four pads or groups of serrations, 60, 61, 62 and 63 arranged on the rectangular co-ordinate axes of the plate surface, and adapted to mesh with the corresponding serrations of plate member 32. To this end the serrations on one plate member will have one less tooth in each group than the corresponding serrations in the groups of the other plate member in order that the plates will be centered as shown in Figs. 3, 5 and 6. Between the groups of serrations on adjustable plate member 34 are drilled holes 64 which have a diameter larger than the diameter of bolts 44 to allow this plate to be moved in relation to bolts 44.

Boss 58 is centrally drilled to provide a bore 66 having flanged lower edges 68 to accommodate the countersunk head of bolt 38.

Washer ring 36 is provided with holes 67 which correspond to the size of bolts 44 and the ring has a large central opening 69 through which boss 58 projects.

In assembly, washer ring 36 is positioned over boss 58 of plate member 34; studs 28 are inserted in holes 70 of bearing 26, and the bearing is assembled to plate member 34 by inserting bolt 38 through bolt hole 66 in boss 58 and bolt hole 72 in bearing 26 and tightening the assembly by means of washer 40 and nut 42. Studs 28 are then screwed into the threaded bolt holes 74 in the base of torque tube 14 to assemble the bearing and adjustable plate member to the rudder. Thus, the vertical axis of bolt 38 coincides with the axis of pivotation of rudder 12 and must be precisely positioned to insure that the axis of pivotation is correct in relation to the fin and the longitudinal center line of the airplane.

Fixed plate member 32 is assembled to frame element 30 by inserting bolts 44 through bolt holes 50 and 48 in the frame element 30 and plate member 32 respectively. The assembly comprising the rudder 14, bearing 26 and upper plate 34 is then positioned on plate 32 so that serrations 60, 61, 62 and 63 of the upper adjustable plate member 34 engage the serrations 54, 55, 56 and 57 of the lower fixed plate respectively, bolts 44 passing through oversized holes 64 in upper plate 34.

If the frame element 30 and the other parts of the airplane were fabricated without manufacturing discrepancies, the serrations will exactly engage and the adjustable plate member 34 will be exactly centered over plate member 32, as shown in Figs. 3, 5 and 6.

Figure 7:
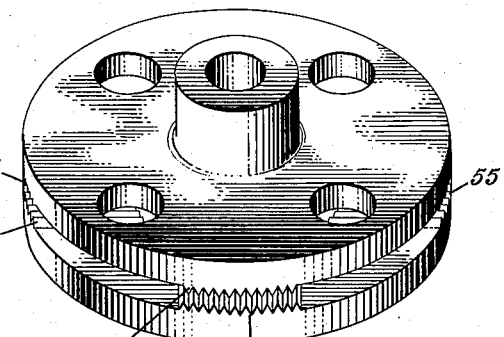
Fig. 7 is a view similar to Fig. 5 but with the adjustable plate member off-centered in one direction in relation to the fixed plate member.

In the event there were manufacturing dimensional discrepancies in the fabrication or assembly of the airplane resulting in the axial point of the plate member 32 mounted on frame element 30 being off center dimensionally in one direction from the desired position of the pivotal axis of torque tube 14, such discrepancy can be corrected by positioning plate member 34 off center in one direction on plate member 32 as shown in Fig. 7. In this case the two opposite groups of serrations of one plate will mate exactly with their corresponding groups of serrations on the other plate, while only a portion of the serrations of the other two groups will mate with their corresponding serrations on the other plate. For example, if plate 34 is moved rearwardly as in Fig. 7, the serrations 56 will mate with serrations 62 and the serrations 54 will mate with serrations 60, but only a portion of serrations 57 will mate with a portion of serrations 63 and only a portion of the serrations 55 will mate with a portion of the serrations 61.

Figure 8:
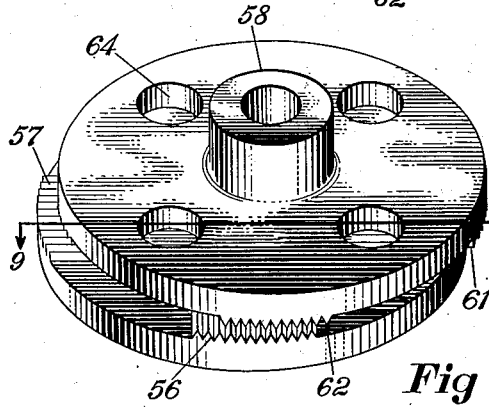
Fig. 8 is a view similar to Figs. 5 and 7 but with the adjustable plate member off-centered in two directions in relation to the fixed plate member.
Figure 9:
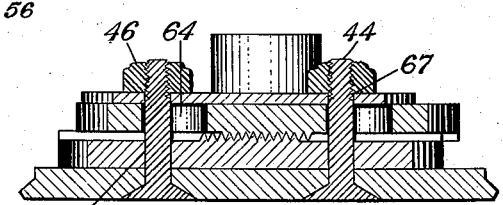
Fig. 9 is a sectional view along lines 9—9 of Fig. 8 with bolts and structural frame member added.

In the event that the assembly is inaccurate in two directions from the desired point to be located, plate member 34 can be moved off-center in two directions relative to plate 32 as shown in Figs. 8 and 9. In this case only a portion of the serrations 60, 61, 62 and 63 of plate 34 will engage a portion of the serrations 54, 55, 56 and 57 of plate 32, respectively.

Whether the plates 34 and 32 engage directly on center or whether they are positioned relatively off-center, any shear loads between the plates will be carried by the engaged serrated teeth.

The amount of displacement of plate member 34 relative to plate 32 is limited by the edge of the oversize holes 64 in plate member 34 abutting bolts 44. While a variety of greater or lesser combinations of adjustments are possible to meet particular adjustment requirements by increasing or decreasing the diameter of the oversize holes 64 and correspondingly increasing or decreasing the number or size of the teeth of serrations 54, 55, 56, 57, 60, 61, 62 and 63, it has been found to be a desirable combination to limit the size of the oversize holes 64 so that they will limit the adjustment of plate 34 relative to plate 32 when not less than half of the serrations of plate 34 are engaging not less than half of the serrations of plate 32.

It will be seen that the present invention provides an adjustable coupling which permits positive locking against displacement of the coupled parts while enabling one portion of the coupling to be adjustably positioned relative to the other portion of the coupling. The adjustable positioning feature and the simplicity of manufacture are among the chief advantages of the invention.

While a preferred embodiment of the invention has been set forth, it is not desired to be limited to the specific structure except as set forth in the appended claims, and it is further understood that modifications may be made without departing from the scope of the claims.

What is desired to be secured by Letters Patent is:

1. An adjustable coupling having a pair of members having abutting surfaces adapted to be joined together comprising: means for preventing displacement between said abutting surfaces including two groups of parallel serrations on one of said surfaces, the serrations of each group being disposed at right angles to and spaced from the serrations of the other group and corresponding groups of serrations on the other of said surfaces adapted to engage the serrations of said one of said surfaces; bolt means for securing said members together; and means whereby one of said members may be adjustably positioned relative to the other of said members including apertures in said one of said members for snugly accommodating the shanks of said bolt means and apertures larger than the shanks of said bolt means in said other of said members through which said bolts project, said oversize apertures permitting limited movement of said other of said members relative to said one of said members while maintaining the engagement of a portion of the serrations of each group of serrations of one member with a portion of the serrations of the corresponding group of serrations on the other of said members.

2. An assembly having a fixed body and a free body adapted to be positioned relative to each other and secured in a joined relationship by a coupling which comprises; a first plate member secured to said fixed body in fixed relationship and having an exposed surface, a second plate member secured to said free body in fixed relationship and having an exposed surface, two groups of parallel serrations on the exposed surface of said first plate member the serrations of each group being disposed at right angles to and spaced from the serrations of the other group, two spaced groups of parallel serrations on the exposed surface of said second plate member adapted to engage with the serrations of said first plate member, bolt means for securing said first plate member to said second plate member and means whereby said bodies may be adjustably positioned relative to each other including apertures in said first plate member having a close fit with the shanks of said bolts and oversize apertures in respect of the shanks of said bolt means in said second plate member through which said bolts project, said oversize apertures permitting limited movement of said second plate member relative to said first plate member while maintaining the engagement of at least half of the serrations of each group of serrations on the exposed surface of said first plate member with at least half of the serrations of each group of serrations on the exposed surface of said second plate member.

3. An adjustable coupling having a pair of members provided with abutting surfaces adapted to be joined together comprising: means for preventing displacement between said abutting surfaces included serrations on each of the abutting surfaces of said members disposed in two groups transversely to each other, each group having a plurality of serrations parallel to each other and at right angles to and spaced from the serrations of the other group, the serrations on the abutting surface of one member being adapted to interlock with the serrations on the abutting surface of the other of said members; means for securing said members in fixed relationship; and means whereby one of said members may be adjustably positioned relative to the other of said members prior to being secured in fixed relationship including the interlocking of a portion of the serrations of one member with a portion of the serrations of the other member.

4. In an adjustable coupling having a pair of members having abutting surfaces adapted to be joined together: means for preventing displacement of one of said abutting surfaces relative to the other of said surfaces comprising two groups of parallel serrations on the abutting surface of one of said members disposed at right angles to and spaced from each other and corresponding groups of serrations on the abutting surface of the other of said members adapted to engage and interlock with the first-mentioned serrations; means for securing said members together, and means whereby one of said members may be adjustably positioned relative to the other of said members before being secured together including the engagement and interlocking of a portion of the serrations on the abutting surface of one of said members with a portion of the serrations on the abutting surfaces of the other of said members.

5. In an adjustable coupling adapted to join two members together and secure the same against displaceemnt: bolts for securing said members together; a first plate member having its abutting surface provided with four groups of serrations spaced from each other, said groups being disposed along and said serrations being parallel to the rectangular co-ordinate axes of said surface; a second plate member having groups of serrations corresponding to and adapted to engage and interlock with the serrations of said first plate member; and means permitting the positioning of said plate members relative to each other prior to being secured together including apertures in said first plate member for snugly receiving said bolts and apertures in said second plate member larger than said bolts through which said bolts project whereby said second plate member is permitted movement relative to said first plate member limited to the engagement of at least half of the serrations of said second plate member with at least half of the serrations of said first plate member.

References Cited in the file of this patent

UNITED STATES PATENTS

| Number | Name | Date |
|---|---|---|
| 425,671 | Harvey | Apr. 15, 1890 |
| 1,177,638 | Larson et al. | Apr. 4, 1916 |
| 1,255,715 | Davison | Feb. 5, 1918 |
| 1,307,160 | Stokes | June 17, 1919 |
| 1,514,652 | Burmaster | Nov. 11, 1924 |
| 2,303,031 | Dusevoir | Nov. 24, 1942 |
| 2,303,032 | Dusevoir | Nov. 24, 1942 |
| 2,437,207 | Noxon | Mar. 2, 1948 |

FOREIGN PATENTS

| Number | Country | Date |
|---|---|---|
| 25,644 | Great Britain | Nov. 15, 1903 |